(12) United States Patent  (10) Patent No.: US 8,823,479 B2
Wang et al.  (45) Date of Patent: Sep. 2, 2014

(54) METHOD FOR POSITIONING A SUSPENSION BODY AND MAGNETIC SUSPENSION DEVICE USING THE METHOD

(76) Inventors: XiaoBing Wang, ShenZhen (CN); LiangQing Li, ShenZhen (CN)

( * ) Notice: Subject to any disclaimer, the term of this patent is extended or adjusted under 35 U.S.C. 154(b) by 0 days.

(21) Appl. No.: 13/496,253

(22) PCT Filed: Jul. 6, 2010

(86) PCT No.: PCT/CN2010/075007
§ 371 (c)(1),
(2), (4) Date: Apr. 20, 2012

(87) PCT Pub. No.: WO2012/003626
PCT Pub. Date: Jan. 12, 2012

(65) Prior Publication Data
US 2013/0093549 A1   Apr. 18, 2013

(51) Int. Cl.
*H01F 1/00*  (2006.01)
*H01F 7/02*  (2006.01)
*H01F 41/02*  (2006.01)
*H02N 15/00*  (2006.01)

(52) U.S. Cl.
CPC ............. *H01F 7/0236* (2013.01); *H01F 41/02* (2013.01); *H02N 15/00* (2013.01)
USPC .......................................... 335/306; 335/296

(58) Field of Classification Search
CPC .............................. H01F 7/0236; H02N 15/00
USPC .................................................. 335/296, 306
See application file for complete search history.

(56) References Cited

U.S. PATENT DOCUMENTS

| | | | | |
|---|---|---|---|---|
| 3,196,566 A | * | 7/1965 | Littlefield | 40/411 |
| 4,382,245 A | * | 5/1983 | Harrigan | 335/306 |
| 4,427,960 A | * | 1/1984 | Wuerfel | 335/285 |
| 4,486,729 A | * | 12/1984 | Lee | 335/306 |
| 5,026,314 A | * | 6/1991 | Samson | 446/133 |
| 5,182,533 A | * | 1/1993 | Ritts | 335/306 |
| 5,404,062 A | * | 4/1995 | Hones et al. | 310/90.5 |
| 5,506,459 A | * | 4/1996 | Ritts | 310/90.5 |
| 6,413,138 B1 | * | 7/2002 | Dokoupil | 446/129 |
| 6,608,540 B1 | * | 8/2003 | Hones et al. | 310/90.5 |
| 6,739,938 B2 | * | 5/2004 | Dokoupil | 446/129 |
| 6,761,610 B2 | * | 7/2004 | Fisher et al. | 446/129 |

(Continued)

*Primary Examiner* — Alexander Talpalatski
(74) *Attorney, Agent, or Firm* — Jackson IPG PLLC

(57) ABSTRACT

The present invention provides a method for positioning a suspension body and a magnetic suspension device using the method. The method comprises the following steps: step 1, providing a positioning auxiliary forming a channel for the suspension body to enter and rotate therein; step 2, placing the positioning auxiliary on a magnetic suspension base, and a center line of the channel of the positioning auxiliary being substantially collinear with a center line of the rotation of the suspension body at work; step 3, according to the channel of the positioning auxiliary, placing the suspension body at the top of the positioning auxiliary; step 4, releasing the suspension body to make it voluntarily slide down to a position to be suspended to work; step 5, removing the positioning auxiliary. The present invention can make the suspension body quickly slide down to be suspended at its work position by means of the positioning auxiliary, and so make the suspension body suspended normally, thereby greatly increasing the use efficiency.

3 Claims, 7 Drawing Sheets

(56) References Cited

U.S. PATENT DOCUMENTS

| | | | |
|---|---|---|---|
| 7,110,236 B2* | 9/2006 | Joachim | 361/139 |
| 7,501,922 B2* | 3/2009 | Kazadi | 335/306 |
| 7,531,929 B2* | 5/2009 | Tong et al. | 310/90.5 |
| 7,671,712 B2* | 3/2010 | Elliott et al. | 335/306 |
| 8,294,542 B2* | 10/2012 | Wang et al. | 335/296 |
| 2006/0214756 A1* | 9/2006 | Elliott et al. | 335/306 |
| 2007/0170798 A1* | 7/2007 | Gohin et al. | 310/90.5 |
| 2009/0079526 A1* | 3/2009 | Tong et al. | 335/285 |

* cited by examiner

METHOD FOR POSITIONING A SUSPENSION BODY AND MAGNETIC SUSPENSION DEVICE USING THE METHOD

FIELD OF THE INVENTION

The present invention relates to a method for positioning a suspension body and a magnetic suspension device using the method, particularly relates to a method for positioning a suspension body via a positioning auxiliary and a magnetic suspension device using the method.

BACKGROUND OF THE INVENTION

With the development of the aesthetical standard of people, a lot of products, such as handicraft articles, gifts, and publicity and exhibition appliances, adopt magnetic suspension technology, which has a comparatively good decorative effect and usability.

A conventional magnetic suspension device comprises a base and a suspension body suspended over the base by magnetic force. A permanent magnet, a control circuit, a sensor, etc., are provided in the base, and a permanent magnet is provided in the suspension body. The suspension body is artistic while being suspended, but it is difficult to position the suspension body to work over the base. A conventional method for positioning the suspension body is shown as follows: place the base on a horizontal surface, hold the suspension body by hand, move the suspension body over the base, and keep on trying to let the suspension body go to find the work position of the suspension body, so as to finally find the work position of the suspension body after trying repeatedly. This method is always difficult, especially for people who contact with the magnetic suspension device for the first time. It will take a long time for people to try to position the suspension body, and sometimes it will even take half an hour to position the suspension body.

However, when merchandise is exhibited via magnetic suspension, the curious viewer might take down the suspension body. It will take a long time for the viewer to position the suspension body again, which is not good for exhibiting the merchandise. So, it is desired to solve the problem that exists for a long time.

SUMMARY OF THE INVENTION

An object of the present invention is to provide a method for positioning a suspension body and a magnetic suspension device using the method, to make the suspension body to quickly slide down to be suspended at its work position by means of a positioning auxiliary, thereby achieving to easily and quickly position the suspension body, whereby the magnetic suspension device using the method is easy to operate and has low cost.

To achieve the above mentioned object, a method for positioning a suspension body of the present invention comprises the following steps:

Step 1, providing a positioning auxiliary defining a channel for the suspension body to pass therethrough and rotate therein;

Step 2, placing the positioning auxiliary on a magnetic suspension base, and a centre line of the channel of the positioning auxiliary being substantially collinear with a centre line of the rotation of the suspension body at work;

Step 3, according to the channel of the positioning auxiliary, placing the suspension body at the top of the positioning auxiliary;

Step 4, releasing the suspension body to make it voluntarily slide down to a position to be suspended to work;

Step 5, removing the positioning auxiliary.

In step 3, according to the centre line of the channel, the suspension body is placed at the top of the positioning auxiliary. In step 4, after releasing the suspension body, the suspension body moves from above to below to slide down to the position to be suspended to work.

A magnetic suspension device of the present invention comprise: a magnetic suspension base, a positioning auxiliary, and a suspension body positioned over the magnetic suspension base via the positioning auxiliary. The positioning auxiliary defines a channel for entry of the suspension body, and the suspension body is rotatable in the channel. While positioning the suspension body, the positioning auxiliary is placed on the magnetic suspension base, and a centre line of the channel of the positioning auxiliary is substantially collinear with a centre line of the rotation of the suspension body at work.

The positioning auxiliary comprises an auxiliary part and a positioning part connected with the auxiliary part; the channel is defined in the auxiliary part; an upper surface of the magnetic suspension base is provided with a limiting part to engage with the positioning part of the positioning auxiliary for limiting a position to place the positioning auxiliary on an upper surface of the magnetic suspension device.

The auxiliary part and the positioning part are an integrally formed sleeve, and the channel is a through hole in the sleeve.

The limiting part is a positioning board demountably assembled to the magnetic suspension base, the positioning board is provided with a positioning pin, the magnetic suspension base is provided with a positioning hole, the positioning board is assembled to the magnetic suspension base via the engagement of the positioning pin and the positioning hole, and via the engagement of the positioning board and the sleeve, the positioning auxiliary is placed on the magnetic suspension base.

The limiting part of the magnetic suspension base is a bulge, a recess, a groove, or an indicating line, which is integrally formed with the magnetic suspension base.

A top of the positioning auxiliary is provided with a ring-shaped shoulder, a channel entrance is formed through the shoulder, and the suspension body is exactly enterable the channel through the channel entrance.

The positioning auxiliary is reverse T-shaped, an outer edge of the positioning part is bigger than the auxiliary part; the outer edge of the positioning part is aligned with a surface edge of the magnetic suspension base, and the limiting part of the magnetic suspension base is the surface edge of the magnetic suspension base; when the outer edge of the positioning part is aligned with the surface edge of the magnetic suspension base, the centre line of the channel is substantially collinear with the centre line of the rotation of the suspension body at work.

The positioning auxiliary is a plurality of positioning poles, the limiting part of the magnetic suspension base is a plurality of limiting holes to receive the positioning poles; the plurality of positioning poles are demountably placed on the magnetic suspension base via the limiting holes, and a centre line of a channel formed by the plurality of positioning poles for the suspension body to enter and rotate therein is collinear with a centre line of the rotation of the suspension body at work.

The advantages of the present invention are that: the method for positioning a suspension body and the magnetic suspension device using the method of the present invention can make the suspension body quickly slide down to be suspended at its work position by means of the positioning auxiliary, and so make the suspension body suspended normally, thereby greatly increasing the use efficiency.

The characteristic and the technical solution of the present invention are best understood from the following detailed description with reference to the accompanying figures, but the figures are only for reference and explaining, not to limit the scope of the invention.

BRIEF DESCRIPTION OF THE DRAWINGS

The technical solution and the beneficial effects of the present invention are best understood from the following detailed description with reference to the accompanying figures and embodiments.

In the figures.

DESCRIPTION OF THE PREFERRED EMBODIMENT

To further set forth the technical solution adopted by the present invention and the effects thereof, the present invention is described detailedly with reference to the following preferred embodiments and the accompanying figures.

Figure 1:
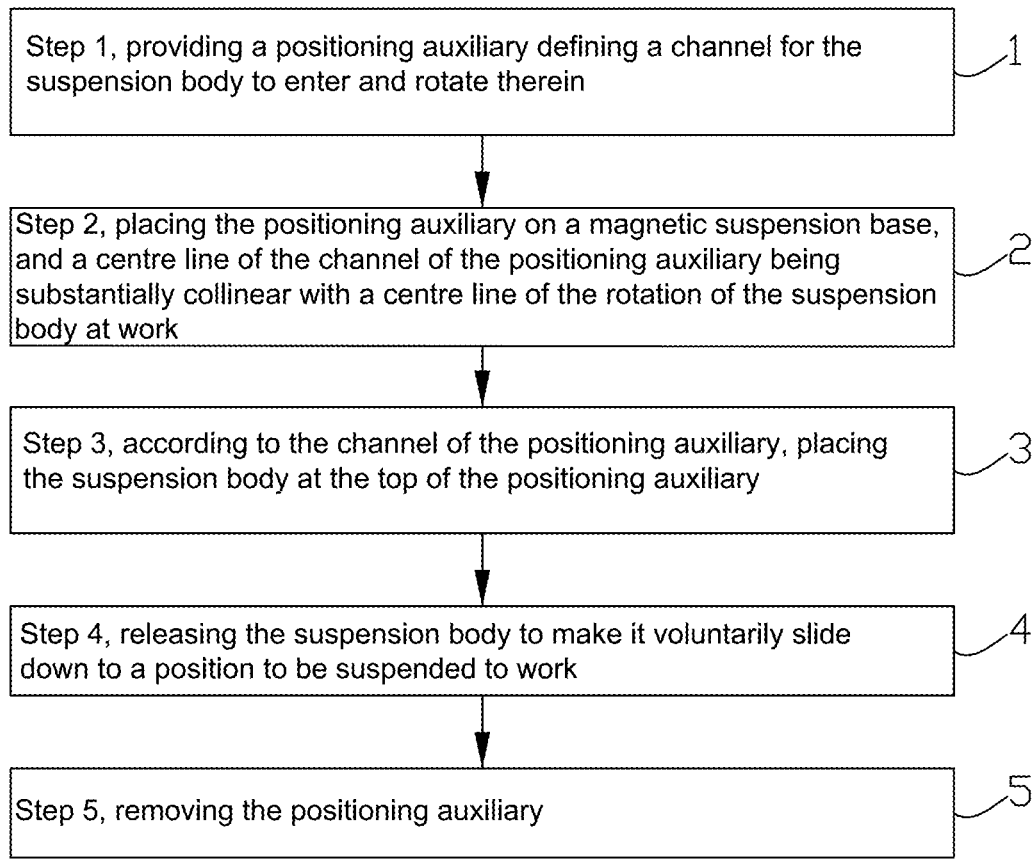
FIG. 1 is a flow chart of a method for positioning a suspension body of the present invention.
Figure 2:
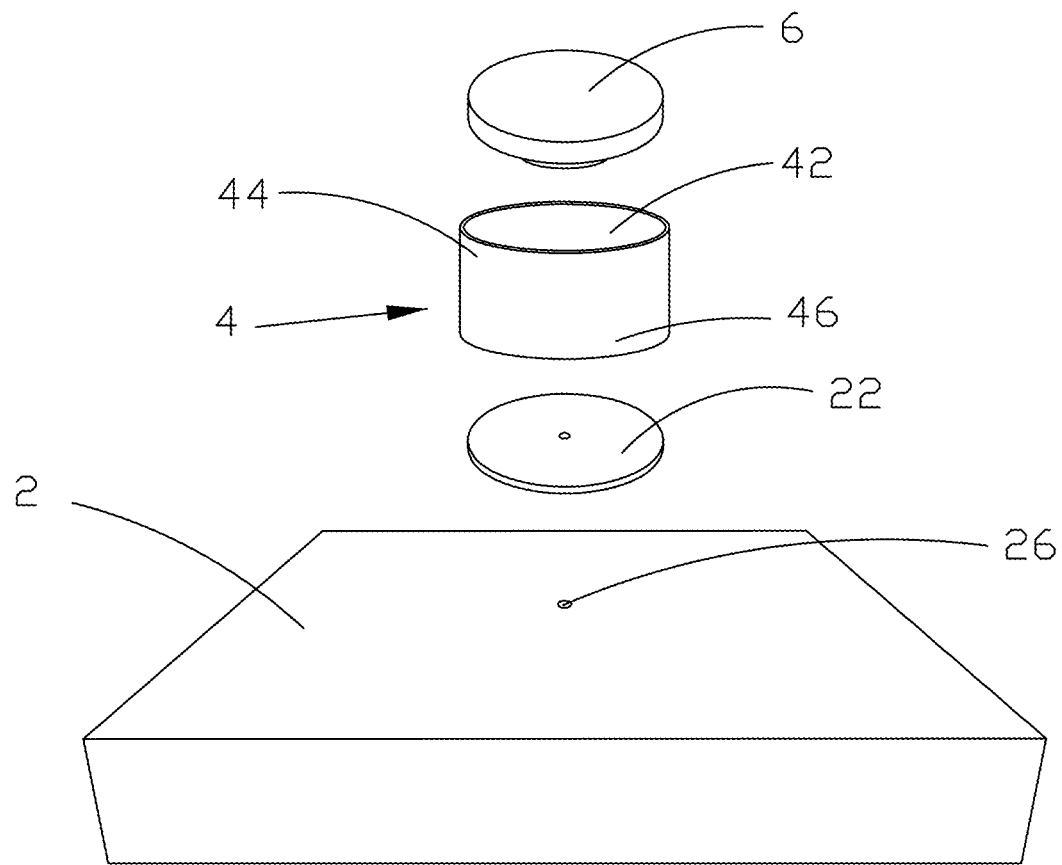
FIG. 2 is a perspective view of a magnetic suspension device in accordance with a first embodiment of the present invention.
Figure 3:
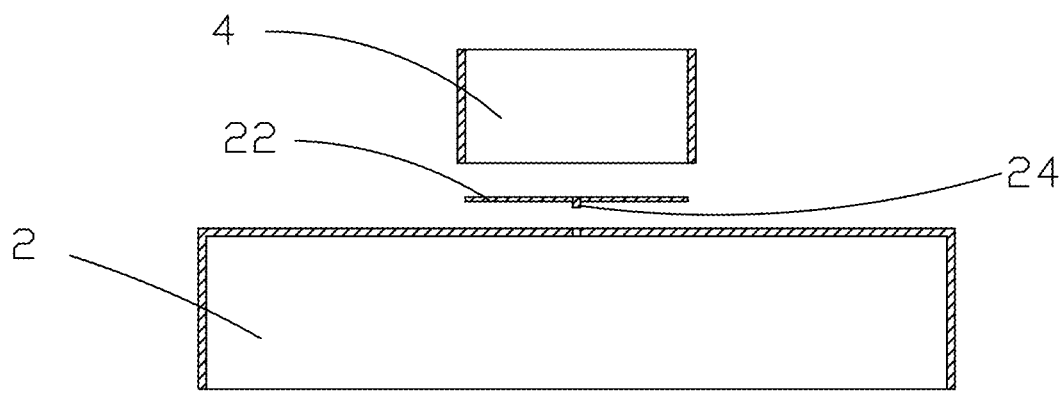
FIG. 3 is an elevational view of a magnetic suspension base and a positioning auxiliary of FIG. 2 in accordance with an embodiment of the present invention.
Figure 4:
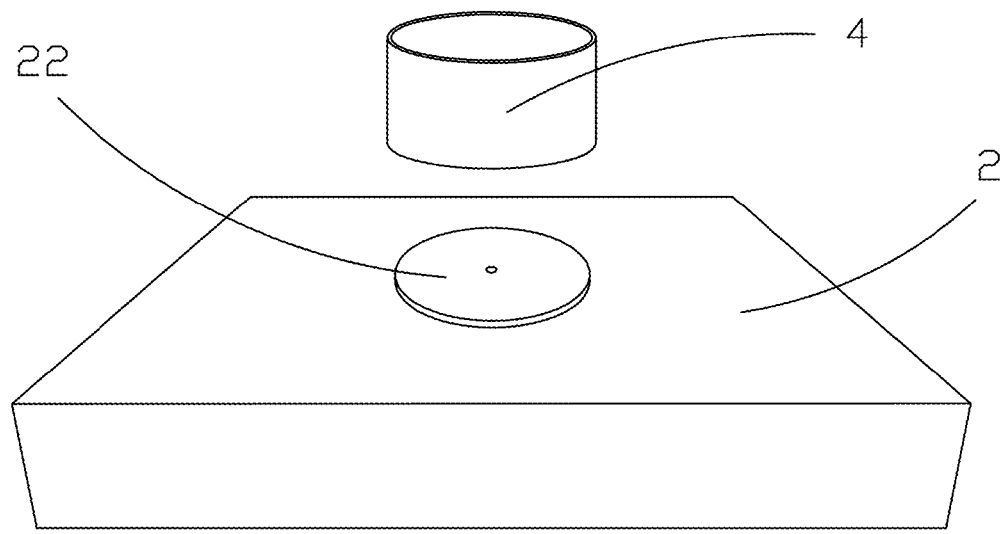
FIGS. 4-6 are schematic views of the operation process of the positioning auxiliary of the magnetic suspension device of FIG. 2.
Figure 5:
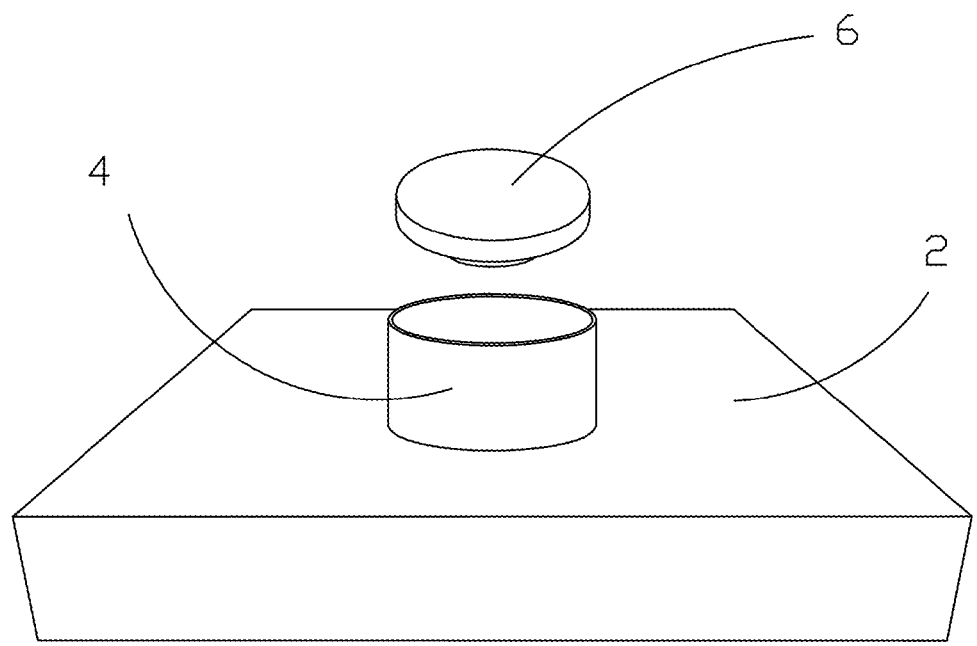
Figure 6:
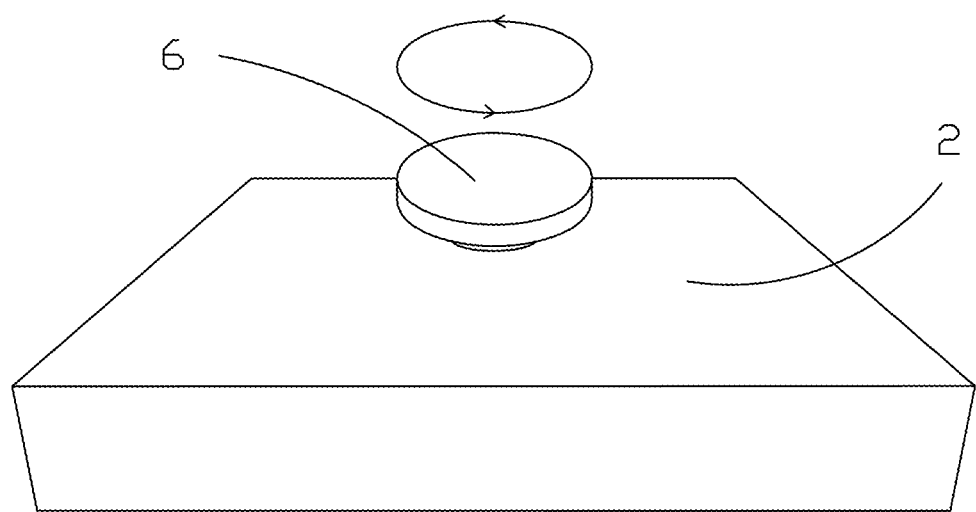

As shown in FIG. 1, a method for positioning a suspension body of the present invention comprises the following steps:

Step 1, providing a positioning auxiliary defining a channel for the suspension body to enter and rotate therein;

Step 2, placing the positioning auxiliary on a magnetic suspension base, and a centre line of the channel of the positioning auxiliary being substantially collinear with a centre line of the rotation of the suspension body at work;

Step 3, according to the channel of the positioning auxiliary, placing the suspension body at the top of the positioning auxiliary; preferably being placed according to the centre line of the channel;

Step 4, releasing the suspension body to make it voluntarily slide down to a position to be suspended to work; preferably making the suspension body to move from above to below to slide down to the position to be suspended to work;

Step 5, removing the positioning auxiliary.

By means of the positioning auxiliary, the present invention can easily and quickly position the suspension body over the magnetic suspension base, solve the long-standing technical problem of being hard to position a suspension body, greatly increase the efficiency of using a magnetic suspension device, and meanwhile make the magnetic suspension device capable of being wildly used in commerce, such as a commercial exhibition. Each step of the present invention can be further detailed and modified, but so long as they are within the scope and spirit of the invention, they all belong to different embodiments of the present invention; that is, the centre position of the magnetic field of the magnetic suspension base is determined via the assisting of the positioning auxiliary, and then after releasing the suspension body, the suspension body voluntarily slides down to a position to be suspended to work.

The magnetic suspension device using the method for positioning a suspension body of the present invention may have many realization ways. For easy understanding, several embodiments of the present invention will be illustrated as follows.

As shown in FIGS. 2-6, a magnetic suspension device in accordance with a first embodiment of the present invention comprises: a magnetic suspension base 2, a positioning auxiliary 4, and a suspension body 6 positioned over the magnetic suspension base 2 via the positioning auxiliary 4; the positioning auxiliary 4 defines a channel 42 for the suspension body 6 to pass therethrough, and the suspension body 6 is rotatable in the channel 42. While positioning the suspension body 6, the positioning auxiliary 4 is placed on the magnetic suspension base 2, and a centre line of the channel 42 of the positioning auxiliary 4 is substantially collinear with a centre line of the rotation of the suspension body 6 at work. The positioning auxiliary 4 comprises an auxiliary part 44 and a positioning part 46 connected with the auxiliary part 44. The channel 42 is defined in the auxiliary part 44.

An upper surface of the magnetic suspension base 2 is provided with a limiting part 22 to engage with the positioning part 46 of the positioning auxiliary 4 for limiting a position to place the positioning auxiliary 4 on the upper surface of the magnetic suspension device 2, thereby making it sure that the centre line of the channel 42 of the positioning auxiliary 4 is substantially collinear with the centre position of magnetic field of the magnetic suspension base 2.

In the present embodiment, the auxiliary part 44 and the positioning part 46 are an integrally formed sleeve, and the channel 42 is a through hole in the sleeve. The limiting part 22 is a positioning board 22 demountably assembled to the magnetic suspension base 2, and the positioning board 22 is provided with a positioning pin 24. The magnetic suspension base 2 is provided with a positioning hole 26, and the positioning board 22 can be assembled to the magnetic suspension base 2 via the engagement of the positioning pin 24 and the positioning hole 26. Via the engagement of the positioning board 22 and the sleeve, the positioning auxiliary 4 is placed on the magnetic suspension base 2. A centre position of the magnetic field of the magnetic suspension base is calculated via conventional techniques, and a centre line of the rotation of the suspension body 6 at work is determined. Then a centre of the positioning board 22 is made to be collinear with the centre line of the rotation of the suspension body 6 at work, and the centre line of the sleeve through hole 42 is made to be collinear with a centre line of the positioning board 22, so as to make a centre line of the channel 42 of the positioning auxiliary 4 to be substantially collinear with the centre line of the rotation of the suspension body 6 at work. The centre line of the rotation of the suspension body 6 at work can also be determined via measuring the work state of the suspension body. Then the centre of the positioning board 22 is made to be collinear with the centre line of the rotation of the suspension body at work, and the centre line of the sleeve through hole 42 is made to be collinear with the centre line of the positioning board 22, so as to make the centre line of the channel 42 of the positioning auxiliary 4 to be substantially collinear with the centre line of the rotation of the suspension body at work.

Figure 7:
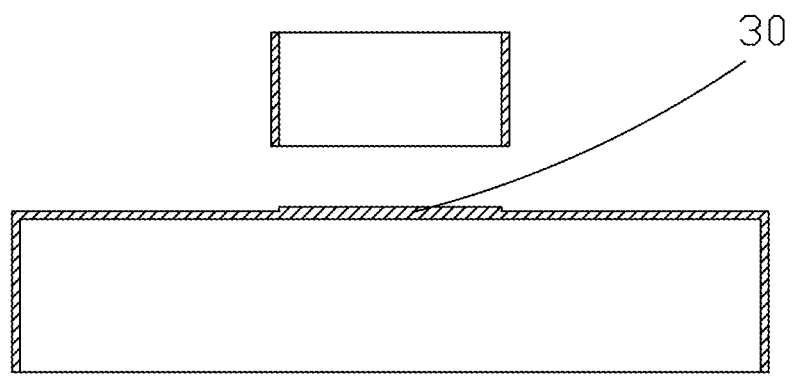
FIGS. 7-10 are schematic views of a limiting part of the magnetic suspension device in accordance with embodiments of the present invention.
Figure 8:
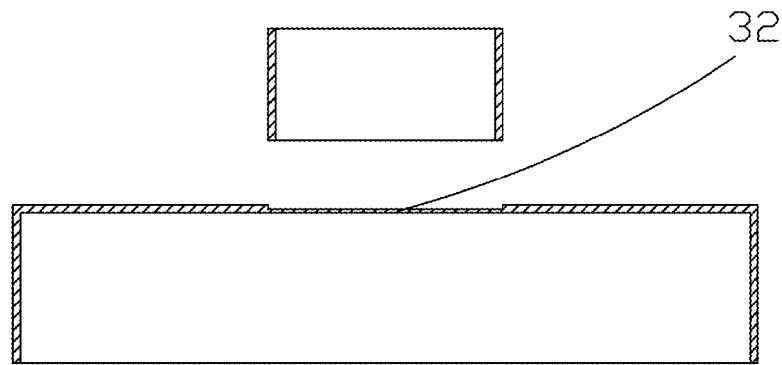
Figure 9:
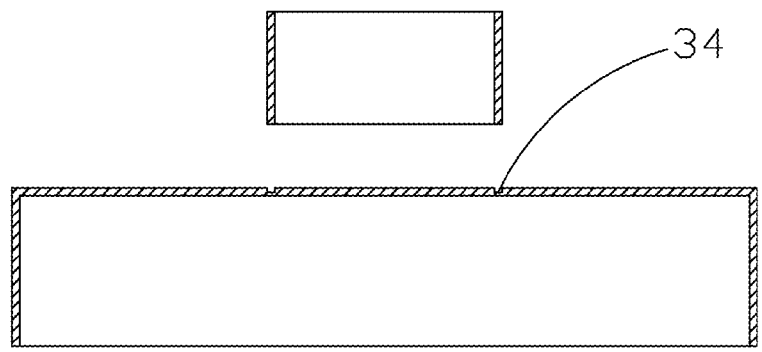
Figure 10:
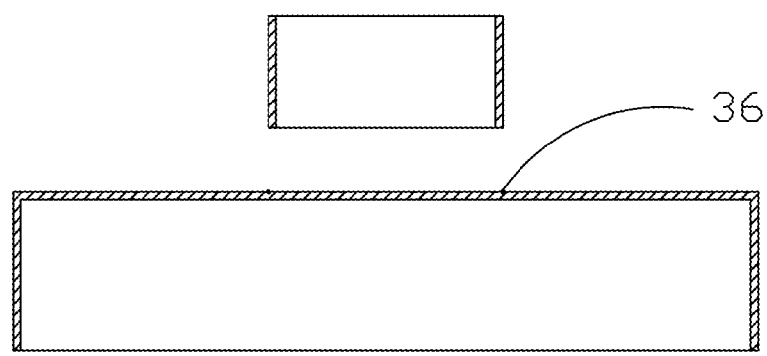

As an alternative embodiment, the limiting part 22 of the magnetic suspension base 2 can also be a bulge 30 (as shown in FIG. 7), a recess 32 (as shown in FIG. 8), a groove 34 (as shown in FIG. 9), or an indicating line 36 (as shown in FIG. 10), etc., which is integrally formed with the magnetic suspension base 2.

The sleeve of the present embodiment is a cylinder, and the sleeve can also be cuboid or other shapes in other embodiments. The positioning board of the present embodiment is round, which is positioned and contained in the through hole of the sleeve. The positioning board 22 can also be other shapes, so long as it can form effective cooperation with the sleeve to be positioned. The positioning pin 24 of the present embodiment is located at the centre of the positioning board 22, and the quantity thereof is one. The positioning hole 22 of the magnetic suspension base 2 is located at the centre position of the magnetic field of the magnetic suspension base 2. In other embodiments, the positioning pin 24 can be a plurality of pins located around the centre of the positioning board 22, and the magnetic suspension base 2 is correspondingly provided with a plurality of positioning holes around the centre position of its magnetic field, so as to correspondingly receive the plurality of positioning pins of the positioning board.

The magnetic suspension base 2 of the present embodiment is square, and can be square, round, polygonal, or any of other shapes. The magnet and control circuit can be provided in the magnetic suspension base 2 through conventional art. The suspension body 6 of the present embodiment is discoid, and can be sphere or other shapes in other embodiments. The suspension body 6 can be a suspension body of a conventional magnetic suspension device, such as various handicraft articles, or can be some new products. So long as the product is provided with a permanent magnet and works according to the magnetic suspension theory, it can be the suspension body 6 of the present invention.

Figure 11:
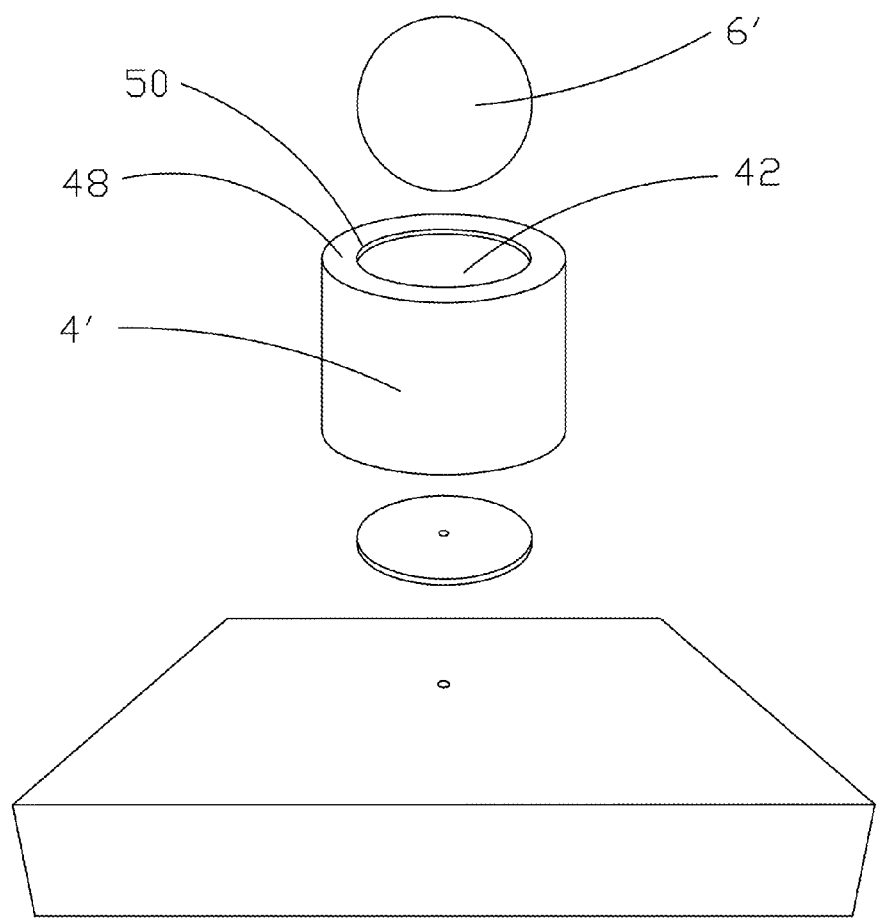
FIG. 11 is a perspective view of a magnetic suspension device in accordance with a second embodiment of the present invention.
Figure 12:
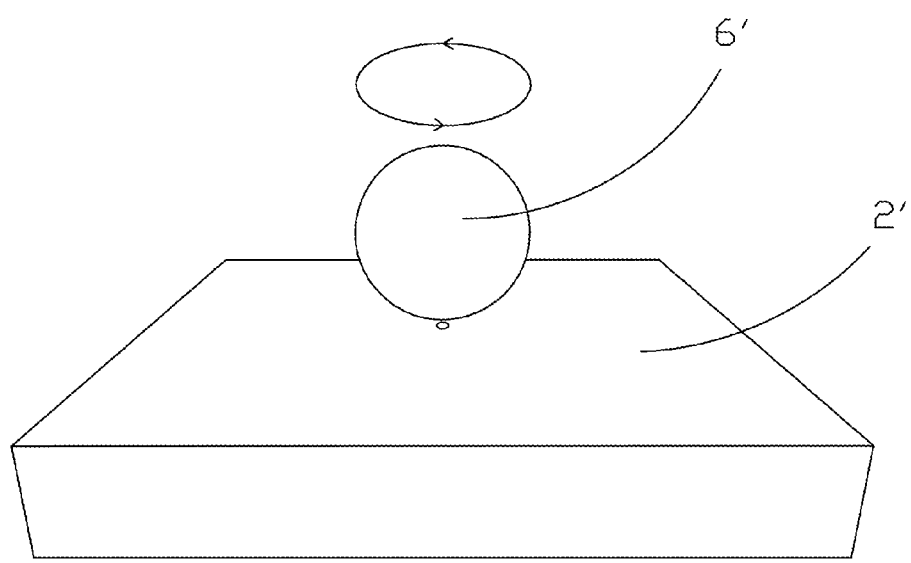
FIG. 12 is a schematic view showing a suspension body of FIG. 11 having been positioned to work normally.

As shown in FIG. 11 and FIG. 12, schematic views of a magnetic suspension device in accordance with a second embodiment of the present invention are shown. Comparing the second embodiment with the first embodiment, the difference is that: the suspension body 6' is sphere; the top of the positioning auxiliary 4' is provided with a ring-shaped shoulder 48, and a channel entrance 50 is formed through the shoulder 48; the suspension body 6' can exactly enter the channel 42 through the channel entrance 50, so as to be more convenient for positioning the suspension body 6' according to the centre line of the channel 42.

Figure 13:
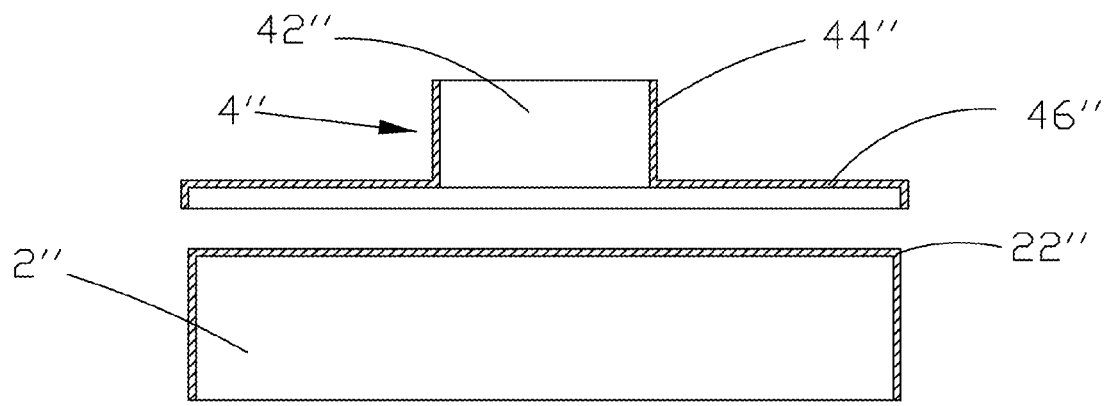
FIG. 13 is a sectional view of a magnetic suspension device in accordance with a third embodiment of the present invention.

As shown in FIG. 13, a sectional view of a magnetic suspension device in accordance with a third embodiment of the present invention is shown. Comparing the third embodiment with the first embodiment, the difference is that: the positioning auxiliary 4" is reverse T-shaped, the outer edge of the positioning part 46" is bigger than the auxiliary part 44", the outer edge of the positioning part 46" is aligned with the surface edge of the magnetic suspension base, and the limiting part 22" of the magnetic suspension base 2" is the surface edge of the magnetic suspension base 2"; when the outer edge of the positioning part 46" is aligned with the surface edge of the magnetic suspension base, the centre line of the channel 42" is substantially collinear with the centre line of the rotation of the suspension body at work.

Figure 14:
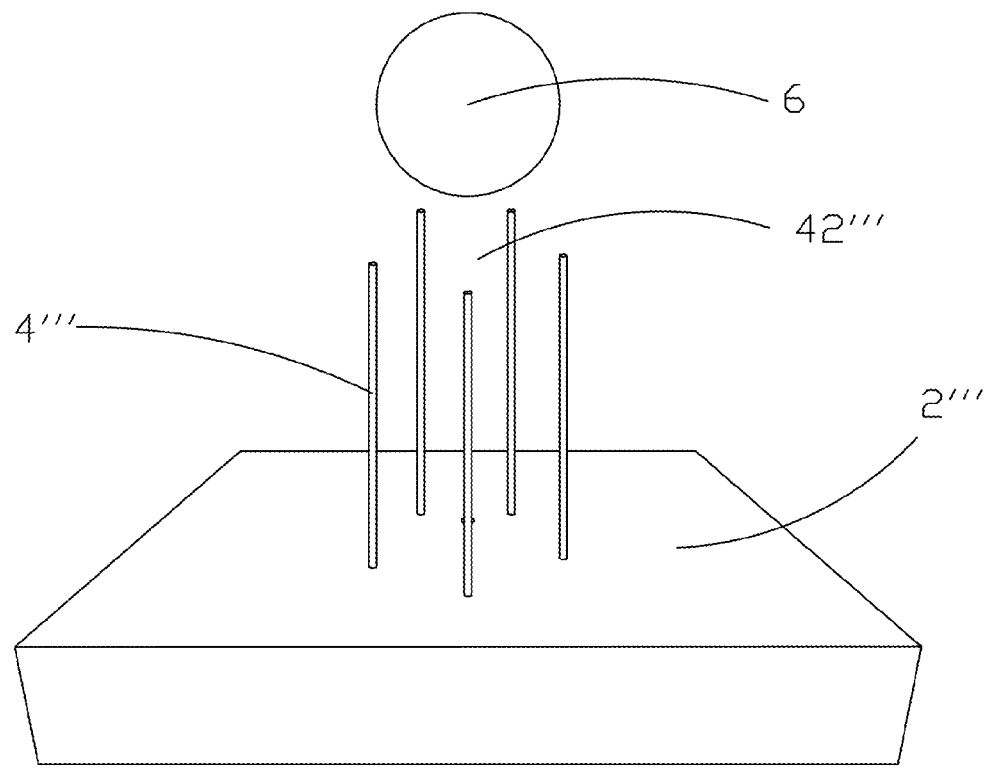
FIG. 14 is a perspective view of a magnetic suspension device in accordance with a fourth embodiment of the present invention.

As shown in FIG. 14, a magnetic suspension device in accordance with a fourth embodiment of the present invention is shown. Comparing the fourth embodiment with the above mentioned embodiments, the difference is that: the positioning auxiliary 4''' is a plurality of positioning poles, and the limiting part of the magnetic suspension base 2''' is a plurality of limiting holes to receive the positioning poles. The plurality of positioning poles are demountably placed on the magnetic suspension base 2" via the limiting holes, and a centre line of a channel 42" formed by the plurality of positioning poles for the suspension body to enter and rotate therein is collinear with the centre line of the rotation of the suspension body at work. The suspension body 6 can be placed from the top the poles, according to the center line of the channel.

In summary, the magnetic suspension device of the present invention can make the suspension body quickly slide down to be suspended at its work position by means of the positioning auxiliary, thereby greatly increasing the use efficiency.

Although the present invention has been described in detail with above said embodiments, but it is not to limit the scope of the invention. So, all the modifications and changes according to the characteristic and spirit of the present invention, are involved in the protected scope of the invention.

What is claimed is:

1. A method for positioning a suspension body comprising the following steps:
   Step 1, providing a positioning auxiliary forming a channel for the suspension body to enter and rotate therein;
   Step 2, placing the positioning auxiliary on a magnetic suspension base, and a centre line of the channel of the positioning auxiliary being substantially collinear with a centre line of the rotation of the suspension body at work;
   Step 3, according to the channel of the positioning auxiliary, placing the suspension body at the top of the positioning auxiliary;
   Step 4, releasing the suspension body to make it voluntarily slide down to a position to be suspended to work; and
   Step 5, removing the positioning auxiliary.

2. The method for positioning a suspension body of claim 1, wherein in step 3, according to the centre line of the channel, the suspension body is placed at the top of the positioning auxiliary; in step 4, after releasing the suspension body, the suspension body moves from above to below to slide down to the position to be suspended to work.

3. A magnetic suspension device comprising a magnetic suspension base, a positioning auxiliary, and a suspension body positioned over the magnetic suspension base via the positioning auxiliary; the positioning auxiliary defining a channel for entry of the suspension body, and the suspension body being rotatable in the channel; while positioning the suspension body, the positioning auxiliary being placed on the magnetic suspension base, and a centre line of the channel of the positioning auxiliary being substantially collinear with a centre line of the rotation of the suspension body at work,
   wherein the positioning auxiliary comprises an auxiliary part and a positioning part connected with the auxiliary part; the channel is defined in the auxiliary part; an upper surface of the magnetic suspension base is provided with a limiting part to engage with the positioning part of the positioning auxiliary for limiting a position to place the positioning auxiliary on an upper surface of the magnetic suspension device, wherein the auxiliary part and the positioning part are an integrally formed sleeve, and the channel is a through hole in the sleeve, wherein the limiting part is a positioning board demountably assembled to the magnetic suspension base, the positioning board is provided with a positioning pin, the magnetic suspension base is provided with a positioning hole, the positioning board is assembled to the magnetic suspension base via the engagement of the positioning pin and the positioning hole, and via the engagement of the positioning board and the sleeve, the positioning auxiliary is placed on the magnetic suspension base.

* * * * *